United States Patent
Xiang et al.

(10) Patent No.: US 10,476,424 B2
(45) Date of Patent: Nov. 12, 2019

(54) MOTOR APPLICATION APPARATUS AND CONTROL METHOD THEREOF

(71) Applicant: JOHNSON ELECTRIC S.A., Murten (CH)

(72) Inventors: Youqing Xiang, Shenzhen (CN); Shiwen Wang, Shenzhen (CN); Wanjun Wang, Shenzhen (CN); Jin Yang, Shenzhen (CN); Jun Zhang, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 0 days.

(21) Appl. No.: 15/814,757

(22) Filed: Nov. 16, 2017

(65) Prior Publication Data

US 2018/0145623 A1    May 24, 2018

(30) Foreign Application Priority Data

Nov. 21, 2016   (CN) .......................... 2016 1 1039468

(51) Int. Cl.
*A47J 27/00* (2006.01)
*H02P 29/60* (2016.01)
*H02P 6/16* (2016.01)

(52) U.S. Cl.
CPC ............... *H02P 29/60* (2016.02); *H02P 6/16* (2013.01)

(58) Field of Classification Search
CPC .................................. H02P 29/60; H02P 6/16
See application file for complete search history.

(56) References Cited

U.S. PATENT DOCUMENTS

| | | | | |
|---|---|---|---|---|
| 5,659,235 A | * | 8/1997 | Yamada | B60L 15/025 318/139 |
| 5,828,200 A | * | 10/1998 | Ligman | H02H 7/0858 318/807 |
| 6,545,438 B1 | * | 4/2003 | Mays, II | H02P 6/08 318/400.01 |
| 2004/0194497 A1 | * | 10/2004 | Sasaki | F01P 3/20 62/505 |
| 2005/0257546 A1 | * | 11/2005 | Ishishita | B60L 3/0023 62/236 |
| 2009/0189559 A1 | * | 7/2009 | Li | A47J 43/0705 318/434 |
| 2014/0339932 A1 | * | 11/2014 | Hossain | H02K 9/005 310/53 |

OTHER PUBLICATIONS

Elavenil et al. (Speed Monitoring and Protection of Motor Using Zigbee Communication ; Elavenil 1, Dr. R. Kalaivani,Departnnent of Electrical and Electronics Engineering, Rajalakshmi Engineering College, Chennai. (Year: 2014).*

* cited by examiner

*Primary Examiner* — Muhammad S Islam
(74) *Attorney, Agent, or Firm* — Muncy, Geissler, Olds & Lowe, P.C.

(57) ABSTRACT

A motor application apparatus is provided. The apparatus includes a motor, a cooling device, a temperature sensor to detect a temperature of the motor, a microcontroller configured to output a controlling signal to control rotation of the motor and acquire a supply current and a rotation speed of the motor in real time. When the temperature of the motor is higher than a predetermined value or the microcontroller determines that the motor is in a high temperature operation state according to the current and the rotation speed, the microcontroller outputs a protection signal to start the cooling device.

12 Claims, 6 Drawing Sheets

MOTOR APPLICATION APPARATUS AND CONTROL METHOD THEREOF

CROSS REFERENCE TO RELATED APPLICATIONS

This non-provisional patent application claims priority under 35 U.S.C. § 119(a) from Patent Application No. 201611039468.7 filed in the People's Republic of China on Nov. 21, 2016.

TECHNICAL FIELD

The present disclosure relates to a motor application apparatus and a control method thereof.

BACKGROUND

A food processor, such as a juicer and a food cooking machine, is a motor application apparatus often used in people's daily life. A food processor includes a motor, a bowl, a heating component and so on. The motor drives a cutting tool to rotate at a high speed and cut the food. The heating component may heat the food when needed. A negative temperature coefficient thermistor is configured to detect a temperature of the motor under operation. When the temperature of the motor is higher than a predetermined value, a microcontroller outputs a starting signal to control a cooling device for the cooling of the motor. However, due to the negative temperature coefficient thermistor detects temperature in a radiation manner, when the temperature of the motor increases abruptly, for example, the load of the motor is increased, the negative temperature coefficient thermistor cannot fast and accurately detect the temperature of the motor, resulting in the failure of the startup of the cooling device, thereby the motor heating or burning may generate.

SUMMARY

In view of the above, a motor application apparatus and a corresponding control method are provided to address the above issues.

The disclosure provides a motor application apparatus, including: a motor; a cooling device configured to dissipate heat for the motor; a temperature sensor configured to detect a temperature of the motor; a microcontroller configured to output a controlling signal to control rotation of the motor and acquire a supply current and a rotation speed of the motor in real time, where the microcontroller outputs a protection signal to start the cooling device, in a case that the temperature of the motor is higher than a predetermined value or the microcontroller determines that the motor is in a high temperature operation state according to the supply current and the rotation speed.

The motor application apparatus according to the present disclosure analyzes the operation state of the motor in real time via a microcontroller, according to the supply current and the rotation speed of the motor, while setting the temperature sensor. In a case that the temperature of the motor detected by the temperature sensor is higher than a predetermined value or the microcontroller determines that the motor is in a high temperature state, the microcontroller starts the cooling device, thereby increasing the reliability of the motor.

Figure 1:
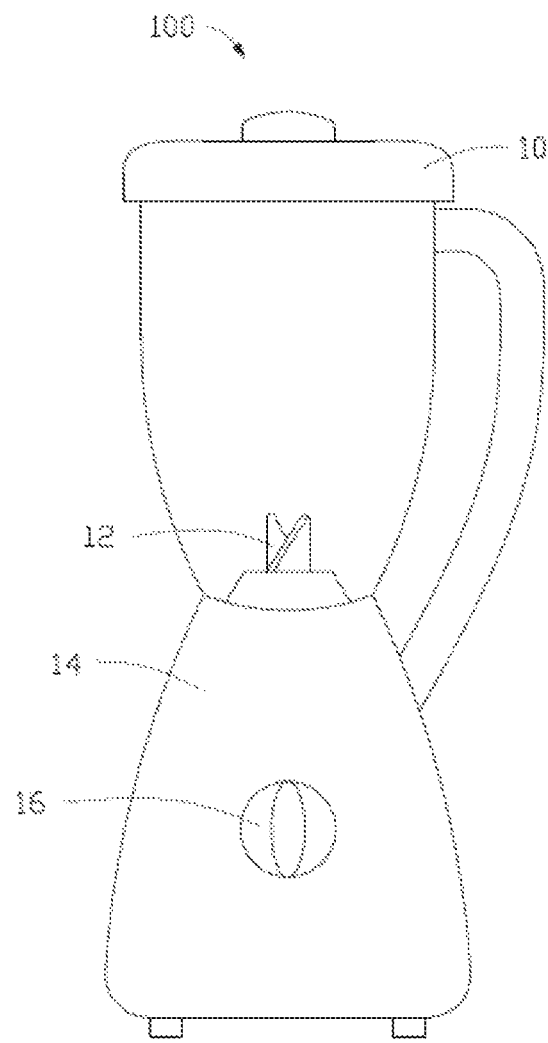
FIG. 1 is a schematic diagram of a food processing machine according to an embodiment of the present disclosure.

The following implementations are used for the description of the present disclosure in conjunction with above figures.

DETAILED DESCRIPTION OF THE EMBODIMENTS

Hereinafter technical solutions in embodiments of the present disclosure are described clearly and completely in conjunction with the drawings in embodiments of the present disclosure. Apparently, the described embodiments are only some rather than all of the embodiments of the present disclosure. Any other embodiments obtained based on the embodiments of the present disclosure by those skilled in the art without any creative work fall within the scope of protection of the present disclosure. It is understood that the drawings are only intended to provide reference and illustration, and not to limit the present disclosure. The connections in the drawings are only intended for the clearance of description, and not to limit the type of connections.

It should be noted that, if a component is described to be "connected" to another component, it may be connected to another component directly, or there may be an intervening component simultaneously. All the technical and scientific terms in the present disclosure have the same definitions as the general understanding of those skilled in the art, unless otherwise defined. Herein the terms in the present disclosure are only intended to describe embodiments, and not to limit the present disclosure.

FIG. 1 shows a motor application apparatus, such as a food processor 100, according to an embodiment of the present disclosure. The food processor 100 includes a bowl 10, a cutting tool 12, a base 14 and a switch 16. The bowl 10 is arranged on the base 14 in which a motor 120 and a drive circuit for the food processor are provided. An output shaft of the motor 120 extends into the bowl 10. The cutting tool 12 is arranged on the output shaft of the motor 120. According to applications of the food processor, the cutting tool 12 may include a slice cutting tool, a hole cutting tool, a reamer, a cross-blade, a noodle chopper, a blender and so on. The switch 16 has various functions, such as a low speed function, a medium speed function, a high speed function, a stop function, and a heating function, to control the food processor to operate in different modes.

Figure 2:
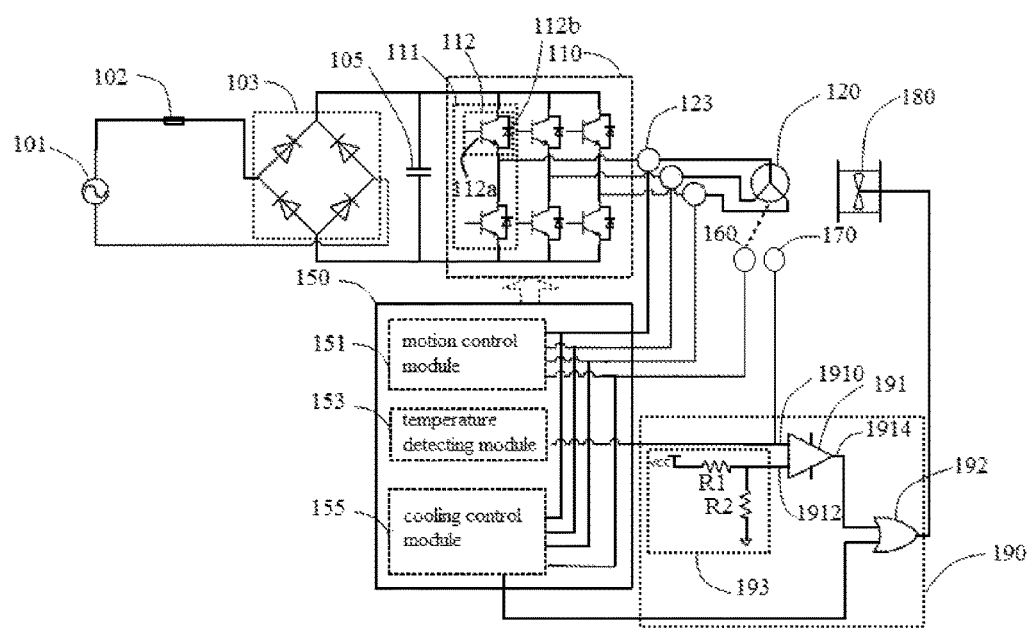
FIG. 2 is a schematic structural diagram of a motor control circuit in the food processing machine illustrated in FIG. 1.

FIG. 2 is a schematic structural diagram of a motor control circuit of the food processor shown in FIG. 1. The motor control circuit of the food processor 100 is connected between the two ends of an alternating current power supply 101. The motor control circuit can include a fuse 102, an AC-DC converter 103, a capacitor 105, an inverter 110, a microcontroller 150, a speed sensor 160, a temperature sensor 170, a cooling device 180 and a cooling control circuit 190. Preferably, the alternating current power supply 101 is an alternating current mains supply with a fixed frequency such as 50 Hz or 60 Hz. A voltage of the alternating current power supply 101 may be 110V, 220V, 330V and so on. The AC-DC converter 103 is configured to rectify the alternating current from the alternating current power supply 101 into a direct current, and may be a bridge rectifier composed of diodes. The capacitor 105 is connected between two output ends of the AC-DC converter 103. The inverter 110 is connected between the two output ends of the AC-DC converter 103, and is configured to convert the direct current into a three-phase alternating current.

In the embodiment, the inverter 110 is a three-phase bridge inverter, and converts the direct current from the AC-DC converter 103 into a three-phase alternating current with various frequencies. The inverter 110 includes three half-bridge circuits 111, each of which is parallel with the capacitor 105 respectively and includes two serial-connected inverting elements 112 and an output end. The output end is connected to a node between the two serial-connected inverting elements 112. Each inverting element 122 includes a transistor 122a and a diode 112b connected to each other in parallel. Each of three-phase alternating current access branches 121 of the motor 120 is connected to a respective output end of each half-bridge circuit 111, so that the motor 120 receives the three-phase alternating current from the inverter 110. The microcontroller 150 outputs a pulse width modulation (PWM) signal, according to the magnet pole position of the rotor of the motor 120, to control the on/off state of each inverting element 112 of the inverter 110, so as to control the commutation of current in the motor 120 and drive the motor 120. The motor 120 drives the cutting tool 12 to rotate and cut foods. In the embodiment, the motor 120 may be a brushless direct current (BLDC) motor. Generally, a fuse 102 is connected between the alternating current power supply 101 and the AC-DC converter 103. In case of a circuit malfunction such as short circuit or overcurrent, the fuse 102 is blown to protect the food processor 100. Each of the three-phase alternating current access branches 121 is connected to a current sensor 123. The current sensors 123 are connected to the microcontroller 150. In the embodiment, the cooling device 180 can be a fan.

The speed sensor 160 is arranged near the rotor of the motor 120 to detect the magnet pole position of the motor 120 and transmit a rotation speed detection signal to the microcontroller 150. In the embodiment, the speed sensor 160 can be a Hall sensor.

The temperature sensor 170 is arranged near a coil of the motor 120 to detect the temperature of the motor 120 and transmit a temperature detection signal to the microcontroller 150. In the embodiment, the temperature sensor 170 can be a negative temperature coefficient thermistor. In another embodiment, the speed sensor 160 and the temperature sensor 170 may be integrated onto one circuit board.

The microcontroller 150 includes a motion control module 151, a temperature detecting module 153 and a cooling control module 155. The motion control module 151 outputs a pulse width modulation signal, according to a current detection value outputted by the current sensor 123 and the rotation speed detection signal outputted by the speed sensor 160. The temperature detecting module 153 receives the temperature detection signal outputted by the temperature sensor 170. The cooling control module 155 receives the current detection value outputted by the current sensor 123 to determine the operation state of the motor, and outputs a protection signal when the motor 120 is in a high temperature state.

The cooling control circuit 190 includes a comparator 191, an OR gate 192 and a voltage division branch 193. A first input end 1910 of the comparator 191 receives the temperature detection signal outputted by the temperature sensor 170. The voltage division branch 193 includes a first resistor R1 and a second resistor R2, both of which are connected in series between a power supply VCC and a ground. A second input end 1912 of the comparator 191 is connected to a node between the first resistor R1 and the second resistor R2. A first input end of the OR gate 192 is connected to an output end 1914 of the comparator 191, to receive a first protection signal outputted by the comparator 191. A second input end of the OR gate 192 is connected to the cooling control module 155 to receive a second protection signal.

Figure 3:
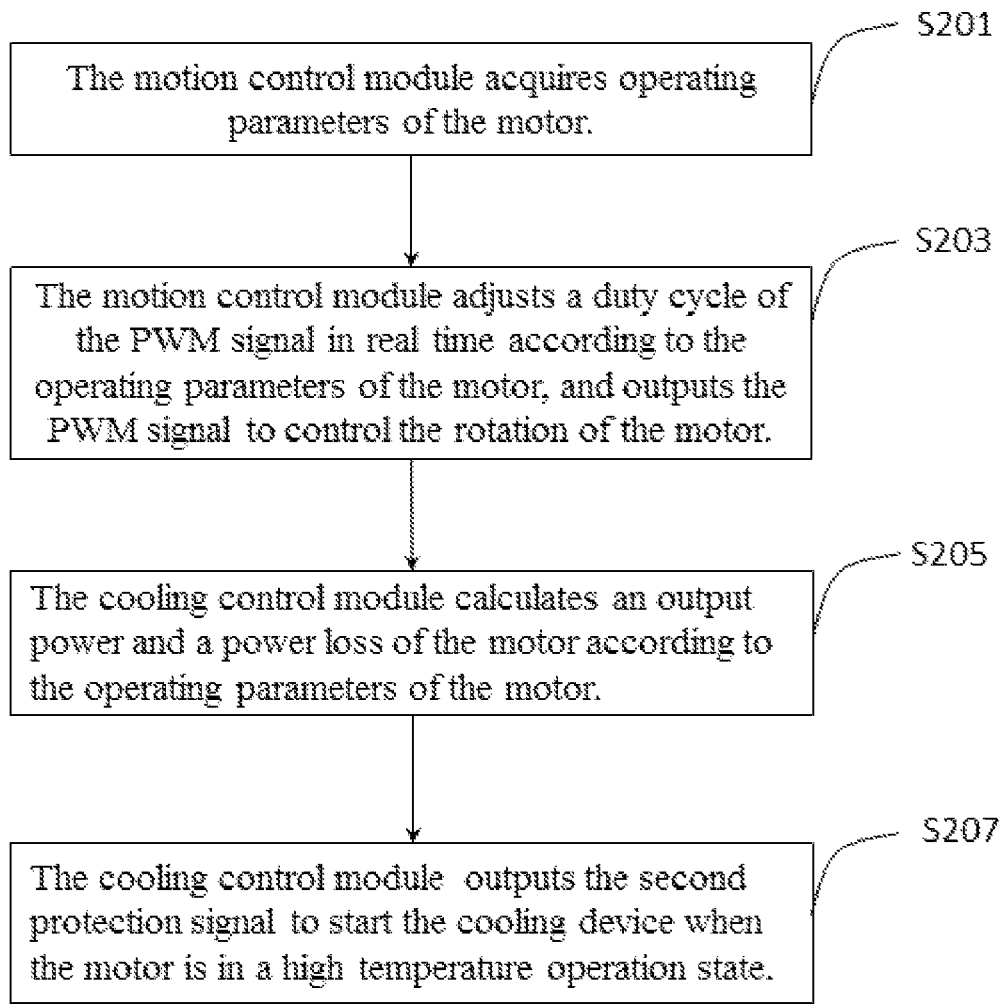
FIG. 3 is a flowchart of a method for controlling a food processing machine according to an embodiment of the present disclosure.

Reference is made to FIG. 3, which is a flowchart of a method for controlling a motor application apparatus according to the present disclosure. The control method includes step S201 to step S207.

In step S201, the motion control module 151 acquires operating parameters of the motor, such as a current value and a rotation speed. In the embodiment, the motion control module 151 acquires the current value of the motor from the current sensor 123, and acquires the rotation speed of the motor from the speed sensor 160.

In step S203, the motion control module 151 adjusts a duty cycle of the pulse width modulation (PWM) signal in real time according to the operating parameters of the motor, and outputs the pulse width modulation signal to control the rotation of the motor. In the embodiment, it is preferred to control the rotation speed of the motor according to a function chosen by a user.

Figure 4:
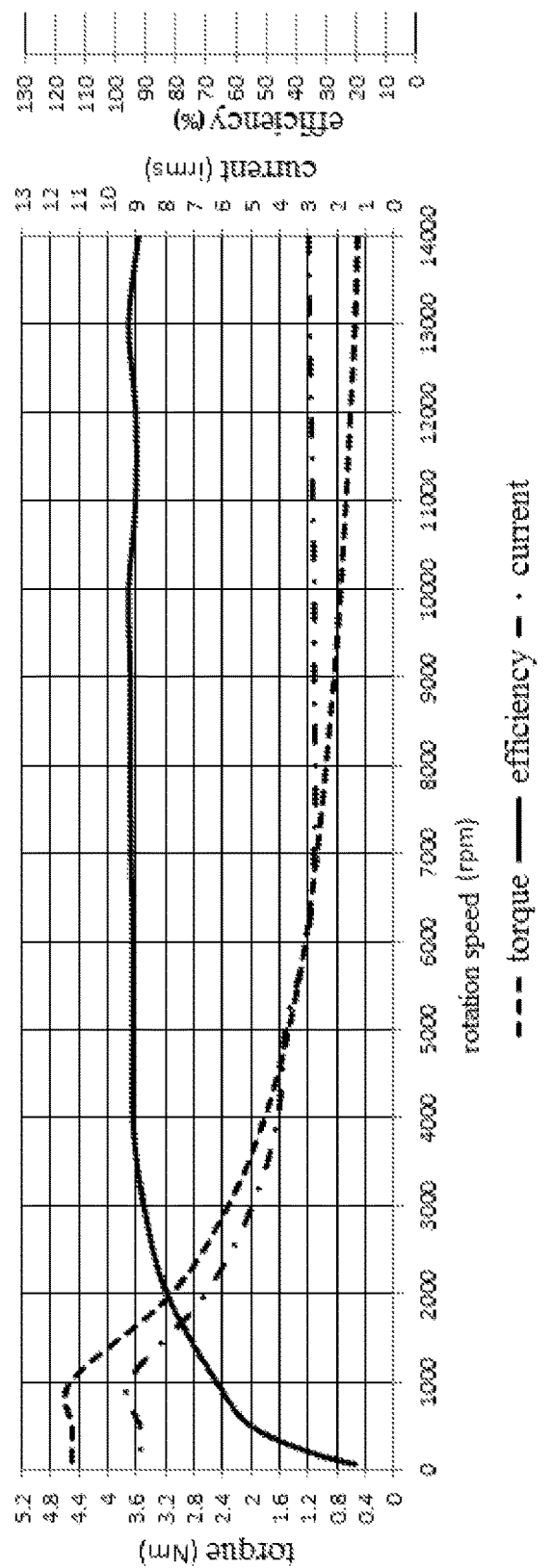
FIG. 4 is a schematic graph of the characteristic curves of torque, efficiency and rotation speed of a motor according to an embodiment of the present disclosure.

In step S205, the cooling control module 155 calculates an output power and a power loss of the motor according to the operating parameters of the motor. FIG. 4 is a schematic graph of characteristic curves of torque, efficiency and rotation speed of the motor according to an embodiment of the present disclosure. In the embodiment, the motion control module 151 calculates the output power and power loss of the motor according to the torque, efficiency and rotation speed shown in FIG. 4.

Figure 5:
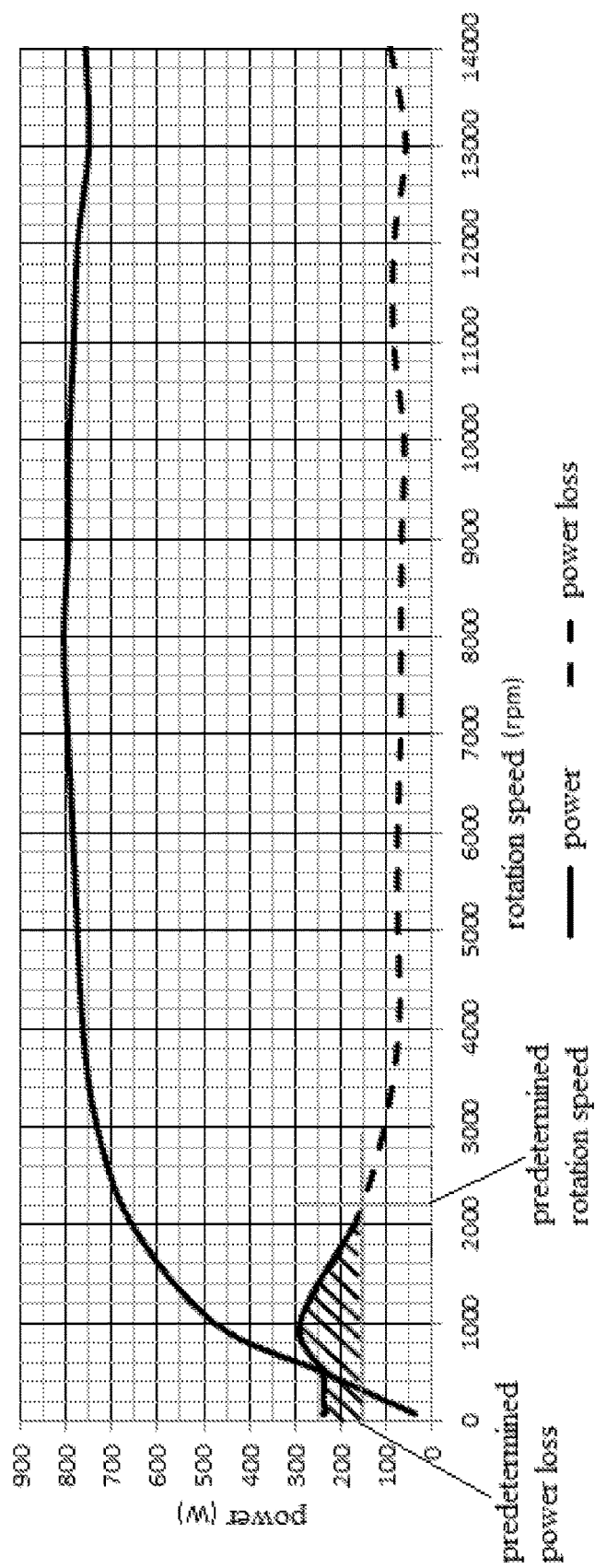
FIG. 5 is a schematic graph of respective characteristic curves of rotation speeds corresponding to output power and power losses of a motor according to an embodiment of the present disclosure.
Figure 6:
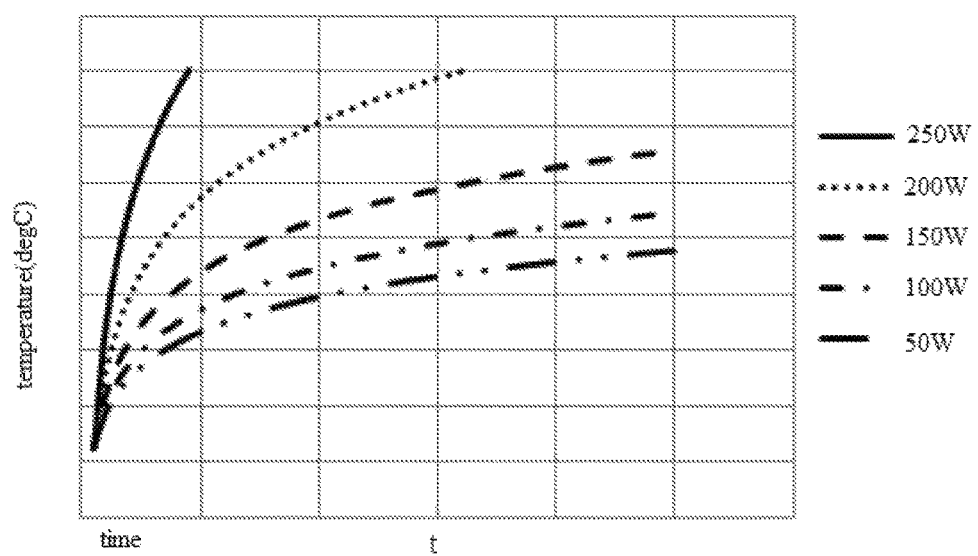
FIG. 6 is a schematic graph of time and temperature corresponding to various power losses of a motor according to an embodiment of the present disclosure.

In step S207, the cooling control module 155 outputs the second protection signal to start the cooling device 180 when the motor is in a high temperature operation state. The high temperature operation state is a state in which the power loss of the motor is larger than a predetermined power loss and the rotation speed of the motor is lower than a predetermined rotation speed. FIG. 5 is a schematic graph of respective characteristic curves of rotation speeds corresponding to output power and power loss of the motor according to an embodiment of the present disclosure, and FIG. 6 is a schematic graph of time and temperature corresponding to various power losses of the motor according to an embodiment of the present disclosure. The predetermined power loss is determined according to the schematic graph of time and temperature corresponding to various power losses of the motor in FIG. 6. After the predetermined power loss is determined, the cooling control module 155 determines whether the second protection signal is output according to the schematic graph of respective characteristic curves of rotation speeds corresponding to output power and power loss of the motor in FIG. 5.

When the above steps are performed, when a voltage value of the temperature detection signal is larger than the voltage across the second resistor, the comparator 191 outputs the first protection signal to start the cooling device 180.

The motor application apparatus and control method according to the present disclosure analyze the operation state of the motor in real time via a microcontroller, according to the current and the rotation speed of the motor, while setting the temperature sensor. In a case that the temperature of the motor detected by the temperature sensor is larger than a predetermined value, or that the microcontroller determines that the motor is in a high temperature state, the microcontroller starts the cooling device, thereby increasing the reliability of the motor.

Described above are exemplary embodiments of the present disclosure, which are not intended to limit the present disclosure. All the modifications, replacements and improvements in the scope of the concepts and principles of the present disclosure are in the scope of the protection thereof.

The invention claimed is:

1. A motor application apparatus, comprising:
 a motor;
 a cooling device;
 and
 a microcontroller configured to output a control signal to control rotation of the motor and acquire a current and a rotation speed of the motor in real time,
 wherein the microcontroller outputs a first protection signal to start the cooling device when a power loss of the motor is larger than a predetermined power loss and the rotation speed of the motor is lower than a predetermined rotation speed simultaneously; and the power loss of the motor is calculated according to a torque, an efficiency and a rotation speed;
 a temperature sensor to detect a temperature of the motor;
 a cooling control circuit which comprises a comparator and an OR gate, wherein a first input end of the comparator is directly connected to the temperature sensor, an output end of the comparator is directly connected to a first input end of the OR gate, an output end of the OR gate is directly coupled with the cooling device.

2. The motor application apparatus of claim 1, wherein when the temperature of the motor is higher than a predetermined value, the cooling device is controlled to start by a second protection signal.

3. The motor application apparatus of claim 1, wherein the cooling device is a cooling fan.

4. The motor application apparatus of claim 1, further comprising a speed sensor to output a rotation speed detection signal to the microcontroller.

5. The motor application apparatus of claim 1, wherein the microcontroller comprises a cooling control module calculating the power loss of the motor according to a characteristic curve of parameters of the motor.

6. The motor application apparatus of claim 2, the comparator directly outputs the second protection signal to the OR gate when a voltage value of a temperature detection signal outputted by the temperature sensor is larger than a predetermined value.

7. The motor application apparatus of claim 4, wherein the speed sensor is a Hall sensor.

8. The motor application apparatus of claim 5, wherein the parameter comprises the torque, the efficiency and the rotation speed.

9. The motor application apparatus of claim 6, wherein:
 the cooling control circuit further comprises a voltage division branch;
 the first input end of the comparator receives a temperature detection signal outputted by the temperature sensor;
 the voltage division branch comprises a first resistor and a second resistor connected in series between a power supply and a ground;
 a second input end of the comparator is connected to a node between the first resistor and the second resistor.

10. The motor application apparatus of claim 6, comprising further:
 a current sensor configured to detect the current of the motor and output a current detection signal to the microcontroller,
 wherein the microcontroller comprises a cooling control module configured to receive a current detection signal outputted by the current sensor to determine the operation state of the motor, and the cooling control module outputs the first protection signal when a power loss of the motor is larger than a predetermined power loss and the rotation speed of the motor is lower than a predetermined rotation speed simultaneously, and a second input end of the OR gate receives the first protection signal.

11. The motor application apparatus of claim 9, wherein the comparator outputs the second protection signal to start the cooling device, when a voltage value of the temperature detection signal outputted by the temperature sensor is higher than a voltage value across the second resistor.

12. The motor application apparatus of claim 10, wherein the current sensor and the temperature sensor are integrated onto one circuit board.

* * * * *